US010823185B2

(12) United States Patent
Mercer et al.

(10) Patent No.: US 10,823,185 B2
(45) Date of Patent: Nov. 3, 2020

(54) MOTOR INTERFACE ASSEMBLY AND A METHOD OF USING THE SAME

(71) Applicant: Carrier Corporation, Palm Beach Gardens, FL (US)

(72) Inventors: Kevin Mercer, Danville, IN (US); Michael Smith, Indianapolis, IN (US); Sunny Ahmed, Indianapolis, IN (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 431 days.

(21) Appl. No.: 15/383,784

(22) Filed: Dec. 19, 2016

(65) Prior Publication Data
US 2017/0176040 A1 Jun. 22, 2017

Related U.S. Application Data

(60) Provisional application No. 62/269,643, filed on Dec. 18, 2015.

(51) Int. Cl.
F24F 11/77 (2018.01)
F04D 27/00 (2006.01)
F24F 1/0007 (2019.01)
F24F 11/76 (2018.01)
F24F 11/30 (2018.01)
F24F 110/10 (2018.01)

(52) U.S. Cl.
CPC ......... *F04D 27/004* (2013.01); *F24F 1/0007* (2013.01); *F24F 11/30* (2018.01); *F24F 11/76* (2018.01); *F24F 11/77* (2018.01); *F24F 2110/10* (2018.01)

(58) Field of Classification Search
CPC ........ F04D 27/00; F04D 27/004; F24F 11/85; F24F 11/77
See application file for complete search history.

(56) References Cited

U.S. PATENT DOCUMENTS

| 3,454,078 | A | | 7/1969 | Elwart |
| 4,167,966 | A | | 9/1979 | Freeman |
| 5,528,229 | A | * | 6/1996 | Mehta ................... F04D 25/088 340/3.4 |
| 5,818,194 | A | * | 10/1998 | Nordby ................. F04D 27/004 318/701 |
| 6,155,341 | A | | 12/2000 | Thompson et al. |
| 6,684,944 | B1 | | 2/2004 | Byrnes et al. |
| 6,952,088 | B2 | * | 10/2005 | Woodward ............... H02P 1/44 318/430 |
| 7,204,429 | B2 | | 4/2007 | Olney |

(Continued)

FOREIGN PATENT DOCUMENTS

| JP | S5535868 A | 3/1980 |
| JP | S5773340 A | 5/1982 |

(Continued)

*Primary Examiner* — Patrick Hamo
(74) *Attorney, Agent, or Firm* — Cantor Colburn LLP

(57) ABSTRACT

A motor interface assembly configured to be operably coupled to a blower assembly, wherein the motor interface assembly is configured to measure a discharge air temperature, determine a difference between the discharge air temperature and a predetermined temperature, and operate the blower assembly based in part on the difference between the discharge air temperature and a predetermined temperature.

13 Claims, 3 Drawing Sheets

(56) References Cited

U.S. PATENT DOCUMENTS

| | | |
|---|---|---|
| 7,983,800 B2 | 7/2011 | Oh et al. |
| 8,013,551 B2 | 9/2011 | Woodward |
| 8,493,008 B2 * | 7/2013 | Merkel ................. F04D 27/004 318/400.08 |
| 9,121,416 B2 * | 9/2015 | Stock ...................... F04D 25/08 |
| 10,001,294 B2 * | 6/2018 | Kawai ..................... F24F 11/70 |
| 2005/0150651 A1 | 7/2005 | Halsey |
| 2012/0212166 A1 * | 8/2012 | Merkel ................. F04D 27/004 318/400.08 |
| 2013/0260668 A1 | 10/2013 | Stakutis et al. |
| 2015/0326152 A1 | 11/2015 | Becerra et al. |
| 2017/0115015 A1 * | 4/2017 | Beilfuss ................ F24F 3/1405 |

FOREIGN PATENT DOCUMENTS

| | | |
|---|---|---|
| JP | S5925932 B2 | 6/1984 |
| JP | S61295443 A | 12/1986 |
| JP | 6256728 A | 3/1987 |

\* cited by examiner

MOTOR INTERFACE ASSEMBLY AND A METHOD OF USING THE SAME

CROSS-REFERENCE TO RELATED APPLICATIONS

The present application is a nonprovisional patent application, which claims priority to U.S. patent application Ser. No. 62/269,643, filed Dec. 18, 2016, which is herein incorporated in its entirety.

TECHNICAL FIELD OF THE DISCLOSED EMBODIMENTS

The presently disclosed embodiments generally relate to heating, ventilation, and air conditioning ("HVAC") systems, and more particularly, to a motor interface assembly and a method of using the same.

BACKGROUND OF THE DISCLOSED EMBODIMENTS

The air flow for an HVAC unit is typically controlled by the type of motor used (e.g. permanent split capacitor motor or electronically commutated motors (ECMs) with variable-speed capability). For ECM motors, air flow is typically modulated by discrete value torque per tap available on the motor, or via communications through a wire harness to a control module with pre-designated control points. Sometimes, use of communications, through a wire harness, can greatly increase the cost of the HVAC system by requiring the purchase of additional components required to communicate with the motor. These additional components may contribute to added complexity for the user.

Alternatively, the use of a single stage thermostat on a ECM motor will typically fail to utilize the full efficiency of the motor because a single stage thermostat cannot communicate with the ECM motor to determine the proper speed tap to operate.

Accordingly, there exists a need to control air flow of the motor without the need for expensive communication controls, thereby enabling satisfactory variable air flow functionality in a simple method using a simple thermostat.

SUMMARY OF THE DISCLOSED EMBODIMENTS

In one aspect, an HVAC assembly is provided. The HVAC assembly includes an HVAC unit including a heat exchanger in airflow communication with a blower assembly, wherein the blower assembly is configured to provide conditioned air though a discharge opening, and a motor interface assembly operably coupled to the blower assembly. In an embodiment, the heat exchanger is configured to allow a medium to flow therethrough. In an embodiment, the medium includes a refrigerant. In one embodiment, the blower assembly includes a motor including a plurality of speed taps.

The motor interface assembly is configured to: measure a discharge air temperature, determine a difference between the discharge air temperature and a predetermined temperature, and operate the blower assembly based in part on the difference between the discharge air temperature and a predetermined temperature.

In one embodiment, the motor interface assembly includes a temperature sensing device in electrical communication with a computing element in further electrical communication with a switching device. In an embodiment, the temperature sensing device is disposed in the discharge opening. In an embodiment, the switching device is operably coupled to the plurality of speed taps. In an embodiment, the computing element is configured to operate the switching device to select one of the plurality of speed taps based in part on the difference between the discharge air temperature and a predetermined temperature.

In one aspect, a method of operating a blower assembly with a motor interface assembly is provided. The method includes operating the motor interface assembly to measure a discharge temperature, operating the motor interface assembly to determine a difference between the discharge temperature and a predetermined temperature, and operating the motor interface assembly to operate the blower assembly based in part on the difference between the discharge temperature and a predetermined temperature. In an embodiment, the predetermined temperature includes at least one of a heating predetermined temperature and a cooling predetermined temperature.

In an embodiment, the motor interface assembly includes a temperature sensing device in electrical communication with a computing element in further electrical communication with a switching device. In an embodiment, the blower assembly includes a motor including a plurality of speed taps, wherein the plurality of speed taps are operably coupled to the switching device.

In an embodiment, operating the motor interface assembly to measure a discharge temperature includes operating the temperature sensing device to measure the discharge air temperature. In an embodiment, operating the motor interface assembly to determine a difference between the discharge temperature and a predetermined temperature includes operating the computing device to determine a difference between the discharge air temperature and the predetermined temperature.

In an embodiment, operating the motor interface assembly to operate the blower assembly based in part on the difference between the discharge temperature and a predetermined temperature includes operating the computing device to operate the switching device based in part on the difference between the discharge air temperature and a predetermined temperature. In an embodiment, the computing element is configured to operate the switching device to select one of the plurality of speed taps based in part on the difference between the discharge air temperature and a predetermined temperature.

DETAILED DESCRIPTION OF THE DISCLOSED EMBODIMENTS

Figure 1:
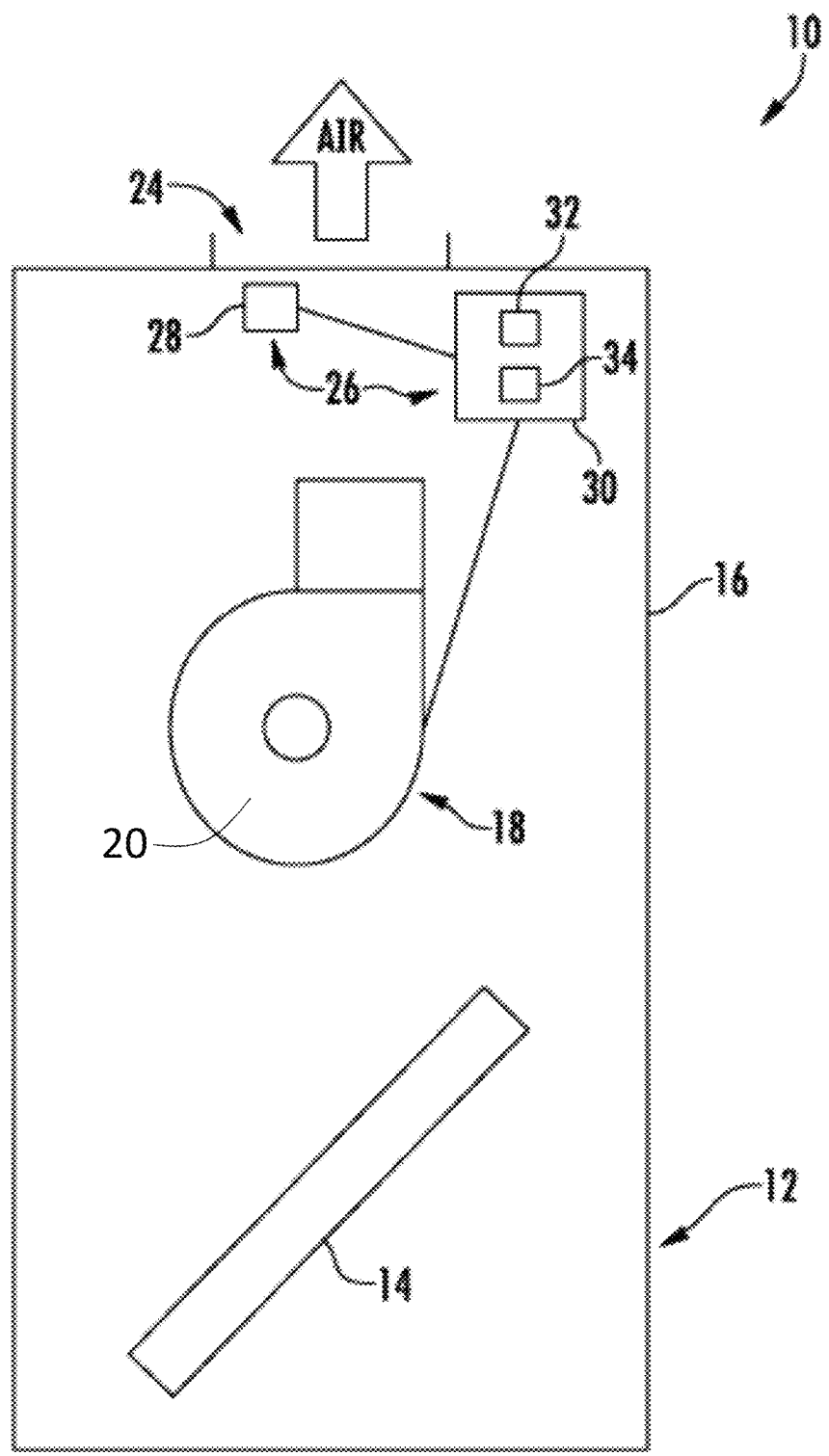
FIG. 1 illustrates a schematic diagram of an HVAC unit according to an embodiment of the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 schematically illustrates an embodiment of an HVAC assembly, generally indicated at 10. In the embodiment shown, the HVAC assembly 10 includes an HVAC unit 12, for example a fan coil, air handler, or a furnace coil coupled to a separate blower box to name a few non-limiting examples. The HVAC unit 12 includes a heat exchanger 14 disposed within an enclosure 16, the heat exchanger 14 is configured to circulate a medium therethrough. In an embodiment, the medium includes a refrigerant. It will be appreciated the medium may be other liquids for transferring heat, for example, water, glycol, brine, etc. to name a few non-limiting examples.

The HVAC unit 12 further includes a blower assembly 18 disposed within the enclosure 16. The blower assembly 18 including a multi-speed motor 20 with a plurality of speed taps 22 (shown in FIG. 2). The HVAC assembly 10 further includes a motor interface assembly 26 operably coupled to the multi-speed motor 20.

For example, each of the speed taps 22 may designate a percentage of the maximum torque, or an actual torque value in a motor program. For instance, speed tap 1 may be 100 percent torque, speed tap 2 may be 50% torque and speed tap 3 may be 25% torque. It will be appreciated that each torque may be associated with a given airflow. The blower assembly 18 is in airflow communication with the heat exchanger 14 to either pull air through or blow air across the heat exchanger 14 to provide conditioned air through a discharge opening 24 to heat or cool an interior space (not shown).

Figure 2:
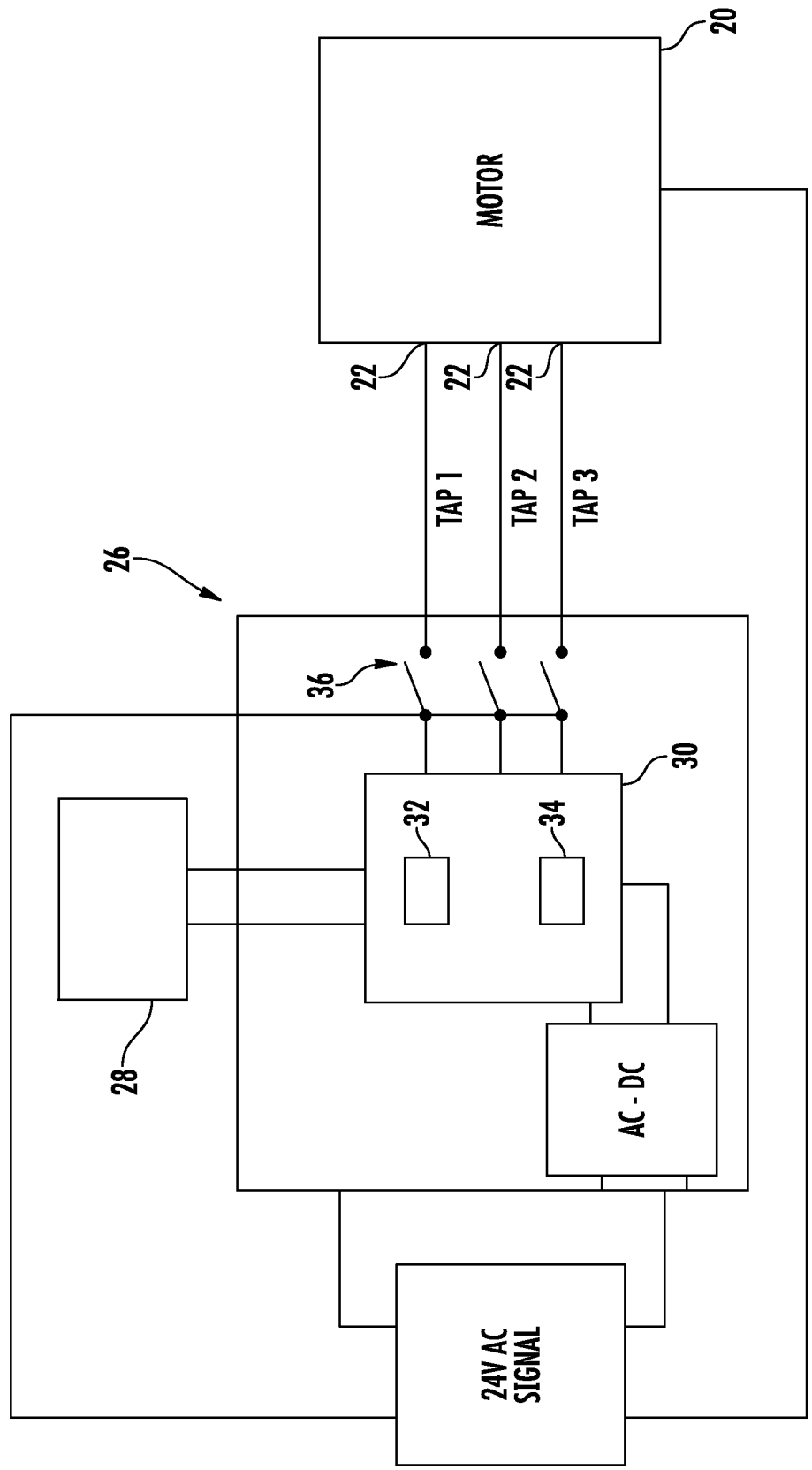
FIG. 2 illustrates an embodiment of a motor interface assembly according to an embodiment of the present disclosure.

As shown in FIG. 2, the motor interface assembly 26 includes a temperature sensing device 28 in electrical communication with a computing element 30 in further electrical communication with a switching device 36, wherein the computing element 30 includes a microprocessor 32 and a memory 34. The temperature sensing device 28 is disposed within the discharge opening 24 and configured to measure a discharge air temperature of the conditioned air as it leaves the discharge opening 24. It will be appreciated that the temperature sensing device 28 may be disposed within any area or location of the enclosure 16, so long as the temperature of the air is measured after the heat exchanger 14, or down-stream of the heat exchanger 14.

The computing element 30 is in electrical communication with the plurality of speed taps 22 via the switching device 36, and is configured to operate the switching device 36 based in part on the discharge air temperature to select one of the plurality of speed taps 20. Alternatively, the plurality of speed taps 22 may be operably coupled to the computing element 30 via a terminal connection (not shown). In such an embodiment, the computing element 30 may transmit a signal to the corresponding terminal for a given speed tap 22 to operate the motor 20 based in part on the discharge air temperature.

Figure 3:
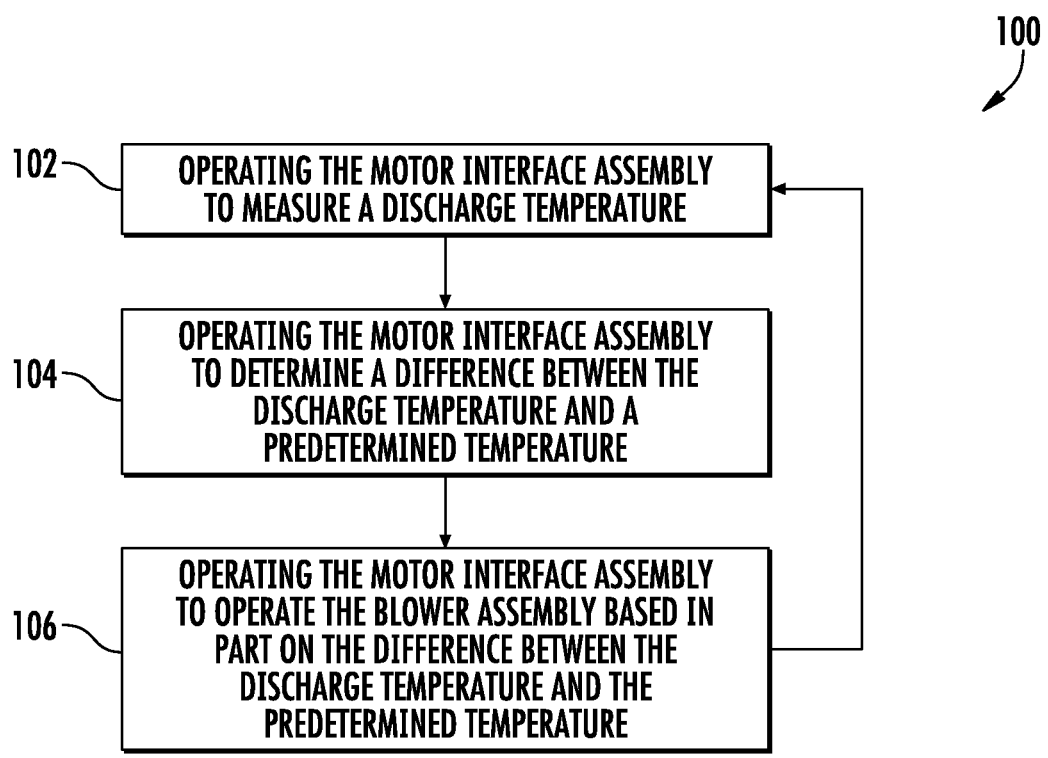
FIG. 3 illustrates a schematic flow diagram of a method of operating a multi-speed motor.

FIG. 3 illustrates a method of operating the motor 20 with the motor interface assembly 26, the method generally indicated at 100. The method 100 includes step 102 of operating the motor interface assembly 26 to measure a discharge temperature. In an embodiment, step 102 includes operating the temperature sensing device 28 to measure a discharge air temperature. For example, as the HVAC unit 12 operates in either a heating or cooling mode, the medium flows through the heat exchanger 14 and the blower assembly 18 either pulls air through or blows air across the heat exchanger 14 to provide conditioned air through the discharge opening 24. The temperature sensing device 28 measures the discharge air temperature at the discharge opening 24.

The method further includes step 104 of operating the motor interface assembly 26 to determine a difference between the discharge temperature and a predetermined temperature. In an embodiment, step 104 includes operating the computing device 30 to determine a difference between the discharge air temperature and a predetermined temperature. In an embodiment, the predetermined temperature includes at least one of a heating predetermined temperature and a cooling predetermined temperature. It will be appreciated that the heating predetermined temperature may be the allowable air temperature range (e.g. approximately 85° F.-95° F.) suitable for effectively heating an interior space, and the cooling predetermined temperature may be the allowable discharge air temperature range (e.g. approximately 55° F.-65° F.) suitable for effectively cooling the interior space. In an embodiment, step 104 further includes operating the computing device 30 to receive the discharge air temperature from the temperature sensing device 28.

For example, with reference to FIG. 1, the temperature sensing device 28 operates to measure the discharge air temperature as it leaves the discharge opening 24. The computing device 30 receives or reads the discharge air temperature from the temperature sensing device 28 and determines the difference between the discharge air temperature from either the heating predetermined temperature and/or a cooling predetermined temperature, depending on the mode of operation of the HVAC unit 12.

The method further includes step 106 of operating the motor interface assembly to operate the blower assembly based in part on the difference between the discharge temperature and a predetermined temperature. In an embodiment, step (c) includes operating the computing device 30 to operate the switching device 36 based in part on the difference between the discharge air temperature and a predetermined temperature. In an embodiment, the computing device 30 is configured to operate the switching device 36 to select one of the plurality of speed taps 22 based in part on the difference between the discharge air temperature and a predetermined temperature.

For example, with reference to FIG. 2, in one embodiment, the computing device 30 includes a heating predetermined temperature of approximately 85° F. (approximately 29.4° C.) stored in memory 34. If the HVAC unit 12 operates in a heating mode and the discharge air temperature is measured, by the temperature sensing device 28, at approximately 90° F. (approximately 32.2° C.), the computing device 30 determines a difference of approximately +5° F. (approximately ±2.8° C.). As such, the computing device 30 may operate the switching device 36 to select one of the plurality of speed taps 22 that would increase the speed of the motor 20 to either pull more air through or blow more air across the heat exchanger 14 to effectively heat the interior space and decrease the measured temperature of approximately 90° F. (approximately 32.2° C.) to approximately 85° F. (approximately 29.4° C.).

Conversely, if the discharge air temperature is measured at approximately 80° F. (approximately 26.7° C.), the computing device 30 determines a difference of approximately −5° F. (approximately −2.8° C.). As such, the computing device 30 may operate the switching device 36 to select one of the plurality of speed taps 22 that would decrease the speed of the motor 20 to either pull less air through or blow less air across the heat exchanger 14 to effectively heat the interior space and increase the measured temperature of approximately 80° F. (approximately 26.7° C.) to approximately 85° F. (approximately 29.4° C.). It will be appreciated that the computing device 30 may operate the switching device 36 to select any of the plurality of speed taps 22 to increase or decrease the speed of the multi-speed motor 20 based on the difference between the predetermined temperature and the measured discharge air temperature.

In another example, if the computing device 30 includes a cooling predetermined temperature of approximately 55° F. (approximately 12.8° C.) stored in memory 34. If the HVAC unit 12 operates in a cooling mode and the discharge air temperature is measured, by the temperature sensing device 28, at approximately 60° F. (approximately 15.6° C.), the computing device 30 determines a difference of approximately +5° F. (approximately 2.8° C.). As such, the computing device 30 may operate the switching device 36 to select one of the plurality of speed taps 22 that would decrease the speed of the motor 20 to either pull less air through or blow less air across the heat exchanger 14 to effectively cool the interior space and decrease the measured temperature of approximately 60° F. (approximately 15.6° C.) to approximately 55° F. (approximately 12.8° C.).

Conversely, if the discharge air temperature is measured at approximately 50° F. (approximately 32.2° C.), the computing device 30 determines a difference of approximately −5° F. (approximately −2.8° C.). As such, the computing device 30 may operate the switching device 36 to select one of the plurality of speed taps 22 that would increase the speed of the motor 20 to either pull more air through or blow more air across the heat exchanger 14 to effectively cool the interior space.

It will therefore be appreciated that the HVAC assembly 10 includes a motor interface assembly 26 configured to control the speed of the motor 20 based in part on the discharge air temperature. Moreover, it should be appreciated that the present invention may be applied to any HVAC fan coil system with a discrete number of motor speeds or to any non-communicating fan coil system.

While the disclosure has been illustrated and described in detail in the drawings and foregoing description, the same is to be considered as illustrative and not restrictive in character, it being understood that only certain embodiments have been shown and described and that all changes and modifications that come within the spirit of the disclosure are desired to be protected.

What is claimed is:

1. An HVAC assembly comprising:
   an HVAC unit comprising a heat exchanger in airflow communication with a blower assembly, wherein the blower assembly is configured to provide conditioned air though a discharge opening, the HVAC unit comprising an enclosure housing the heat exchanger and the blower; and
   a motor interface assembly positioned at the enclosure, the motor interface assembly operably coupled to the blower assembly, the motor interface assembly including a memory, wherein the motor interface assembly is configured to:
   (a) measure a discharge air temperature;
   (b) determine a difference between the discharge air temperature and a predetermined temperature stored in the memory; and
   (c) operate the blower assembly based in part on the difference between the discharge air temperature and a predetermined temperature;
   wherein the blower assembly comprises a motor including a plurality of speed taps;
   wherein the motor interface assembly comprises a temperature sensing device in electrical communication with a computing element in further electrical communication with a switching device;
   wherein the computing element is configured to operate the switching device to select one of the plurality of speed taps based in part on the difference between the discharge air temperature and a predetermined temperature.

2. The HVAC assembly of claim 1, wherein the heat exchanger is configured to allow a medium to flow therethrough.

3. The HVAC assembly of claim 2, wherein the medium comprises a refrigerant.

4. The HVAC assembly of claim 1, wherein the temperature sensing device is disposed in the discharge opening.

5. The HVAC assembly of claim 1 wherein the switching device is operably coupled to the plurality of speed taps.

6. A method of operating a blower assembly with a motor interface assembly, the method comprising:
   (a) operating the motor interface assembly to measure a discharge temperature;
   (b) operating the motor interface assembly to determine a difference between the discharge temperature and a predetermined temperature, the predetermined temperature stored in a memory of the motor interface assembly; and
   (c) operating the motor interface assembly to operate the blower assembly based in part on the difference between the discharge temperature and a predetermined temperature;
   wherein the motor interface assembly comprises a temperature sensing device in electrical communication with a computing element in further electrical communication with a switching device;
   wherein the blower assembly comprises a motor including a plurality of speed taps, wherein the plurality of speed taps are operably coupled to the switching device.

7. The method of claim 6, wherein the predetermined temperature comprises at least one of a heating predetermined temperature and a cooling predetermined temperature.

8. The method of claim 6, wherein step (a) comprises operating the temperature sensing device to measure the discharge air temperature.

9. The method of claim 6, wherein step (b) comprises operating the computing device to determine a difference between the discharge air temperature and the predetermined temperature.

10. The method of claim 6, wherein step (c) comprises operating the computing device to operate the switching device based in part on the difference between the discharge air temperature and a predetermined temperature.

11. The method of claim 10, wherein the computing element is configured to operate the switching device to select one of the plurality of speed taps based in part on the difference between the discharge air temperature and a predetermined temperature.

12. The HVAC assembly of claim 1, wherein the predetermined temperature stored in the memory comprises at least one of a heating predetermined temperature and a cooling predetermined temperature.

13. The HVAC assembly of claim 1, wherein the predetermined temperature stored in the memory comprises a heating predetermined temperature and a cooling predetermined temperature.

* * * * *